April 3, 1945.　　　H. P. GUIRL　　　2,372,893
APPARATUS FOR WELDING STRIPS OR FINS TO METALLIC BODIES
Filed Feb. 11, 1943　　　3 Sheets-Sheet 1
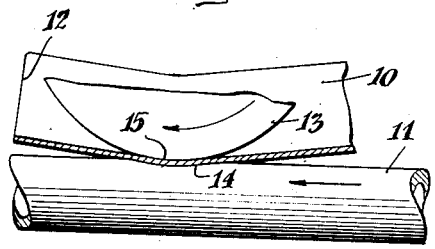
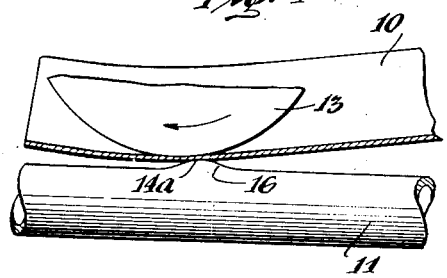
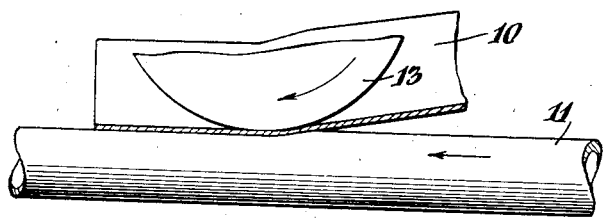
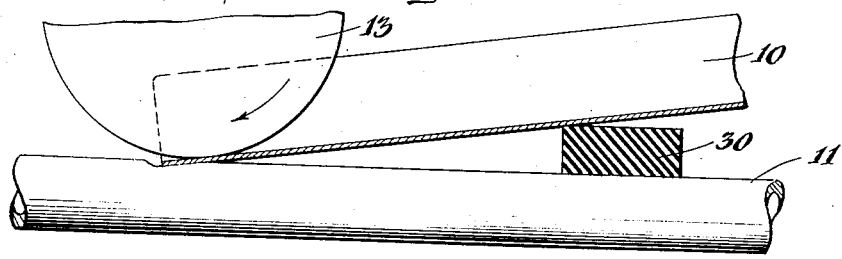
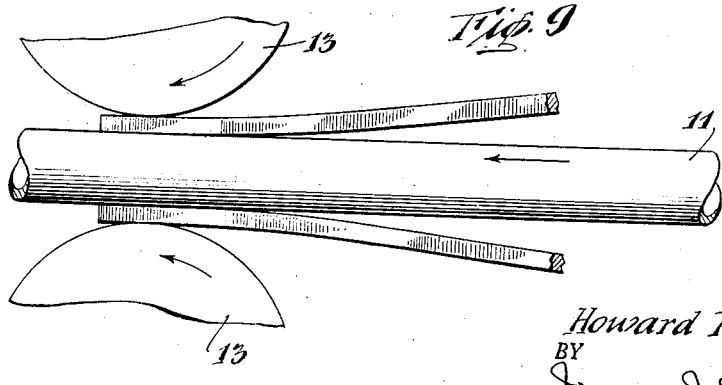
INVENTOR.
Howard P. Guirl
BY
ATTORNEY April 3, 1945. H. P. GUIRL 2,372,893
APPARATUS FOR WELDING STRIPS OR FINS TO METALLIC BODIES
Filed Feb. 11, 1943 3 Sheets-Sheet 2
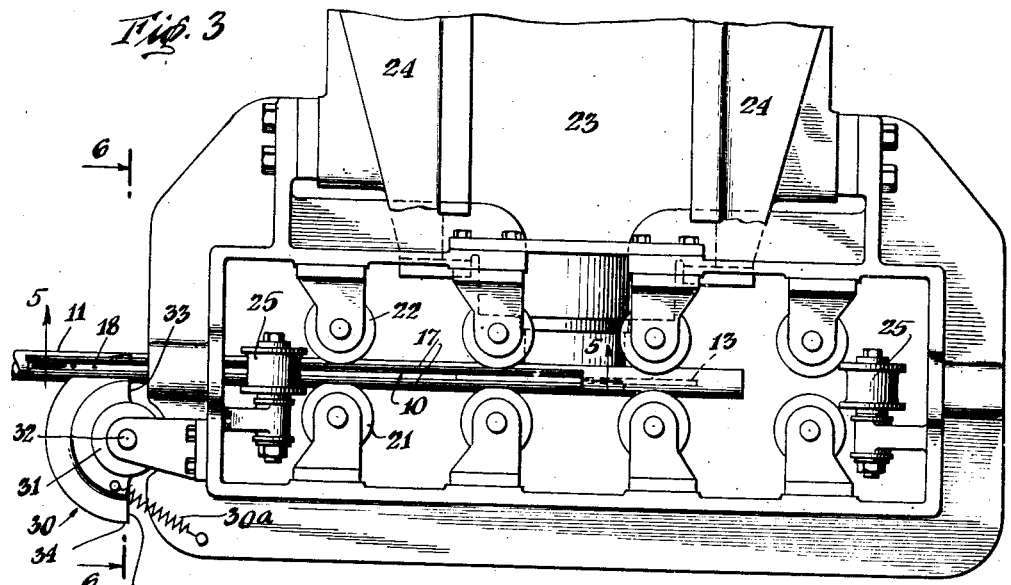
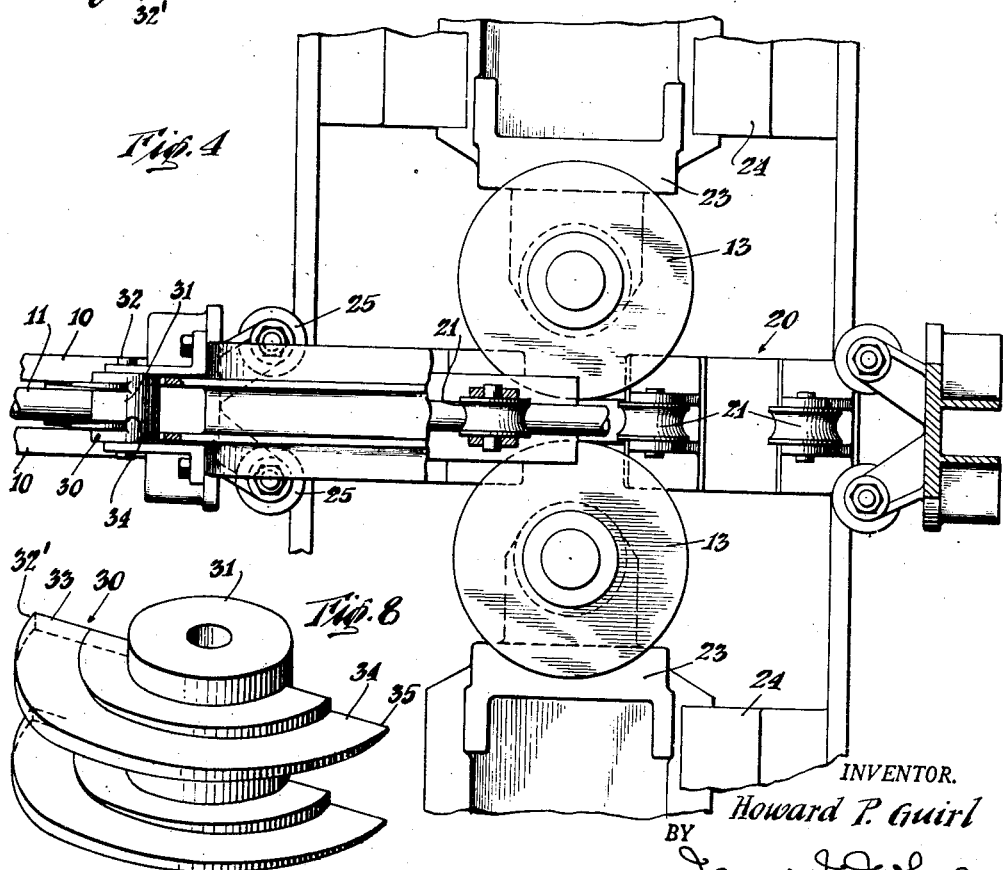
INVENTOR.
Howard P. Guirl
BY
ATTORNEY April 3, 1945.  H. P. GUIRL  2,372,893
APPARATUS FOR WELDING STRIPS OR FINS TO METALLIC BODIES
Filed Feb. 11, 1943   3 Sheets-Sheet 3
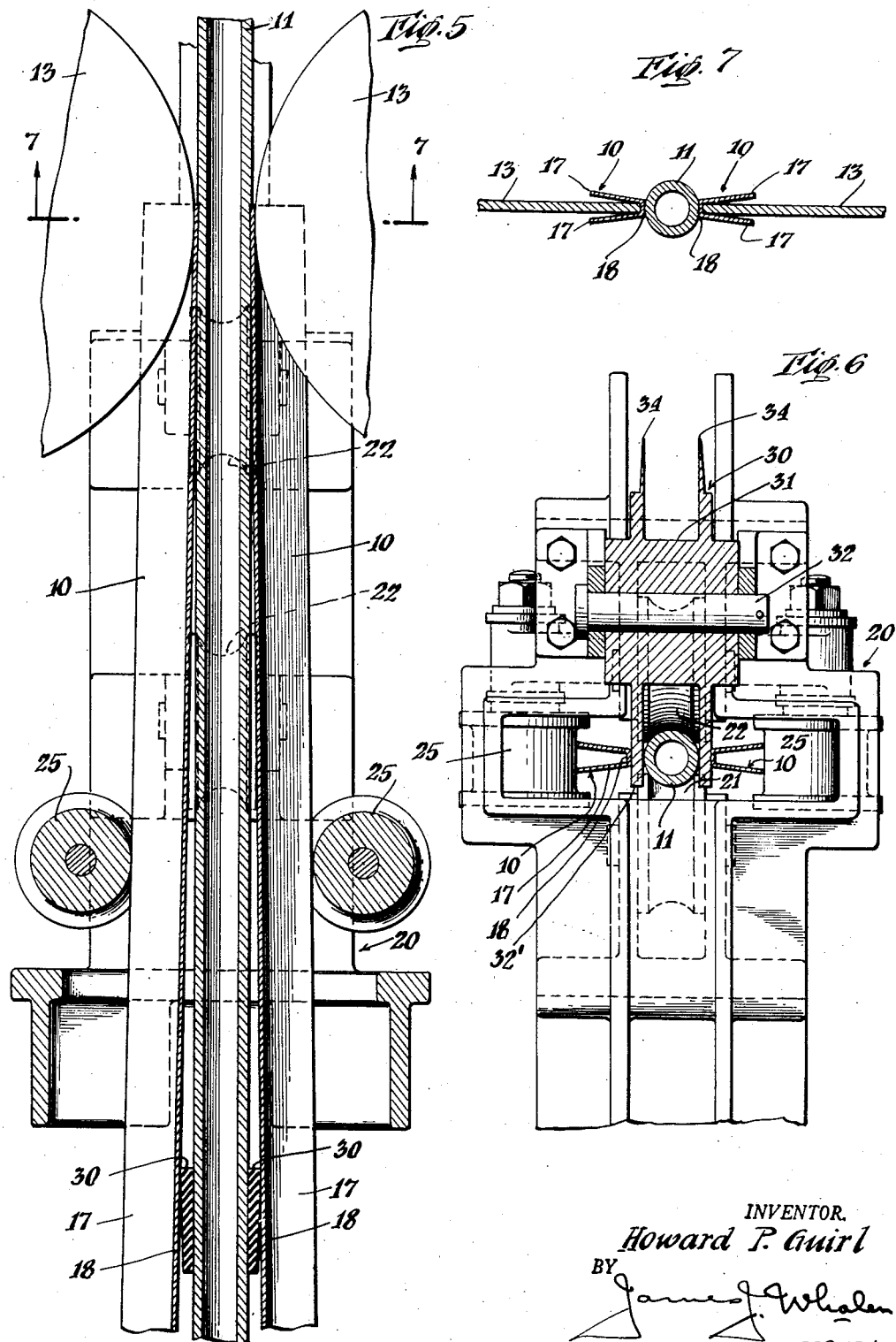
INVENTOR.
Howard P. Guirl
BY
ATTORNEY Patented Apr. 3, 1945

2,372,893

UNITED STATES PATENT OFFICE 2,372,893

APPARATUS FOR WELDING STRIPS OR FINS TO METALLIC BODIES

Howard P. Guirl, Munster, Ind., assignor to The Superheater Company, New York, N. Y.

Application February 11, 1943, Serial No. 475,520

3 Claims. (Cl. 219—4)

This invention relates to electric welding and particularly to an improved method of and apparatus for resistance welding a metallic member of relatively small cross-sectional area to a larger metallic body; such, for example, as the welding to a heat transfer tube of a fin that serves to extend the surface thereof.

Heretofore it has been customary to weld thin metallic fins to heat transfer tubes by holding the fin in contact with the surface of the tube under pressure while simultaneously passing a welding current between the fin and tube. However, it has been difficult, if not impossible, in most instances to effect a proper weld between the first few inches of the fin and the tube due to dissipation of the welding current at the start of the welding operation.

The present invention contemplates starting this welding operation with a foot or so of the fin rearward of the welding point maintained out of contact with the tube so that a proper resistance may be built up between the fin and tube even at the start of the welding operation. The invention will be best understood upon consideration of the following detailed description of illustrative embodiments thereof when read in conjunction with the accompanying drawings.

Figs. 1a, 1b and 1c are diagrammatic views illustrating the conditions prevailing during resistance welding of a fin to a tube under conventional methods;

Figure 2a is a diagrammatic view representing conditions prevailing at the start of the welding of a fin to a tube in accordance with the present invention.

Figure 3 is an elevational view of part of a welding machine equipped to carry out resistance welding of a fin to a tube in accordance with the present invention;

Figure 4 is a plan view corresponding to Figure 3 with some parts broken away to show the welding electrodes in use;

Figure 5 is a view on an enlarged scale corresponding to part of Figure 4 with parts broken away and some parts shown in section.

Figure 6 is a sectional view on the line 6—6 in Figure 3.

Figure 7 is a sectional view on the line 7—7 in Figure 5.

Figure 8 is a perspective view on an enlarged scale showing the fiber shims appearing in Figs. 3 to 6 that maintain the leading part of the fin rearwardly of its tip away from contact with the tube; and Figure 9 is a diagrammatic view illustrating a tube with fins that have had a semi-permanent curvature imposed thereon prior to welding for maintaining the leading part thereof away from the tube without the use of shims.

As mentioned above it has been found that in welding metallic fins of relatively thin material to thin walled metallic tubes of small diameter, the first six or eight inches of the fins 10 do not become properly welded to the tube 11 as indicated at 12 in Figure 1. The apparent reason for the lack of weld in this region is that since none of the fin is yet attached by a weld to the tube when the weld is started and thus is not held firmly, all the pressure of the electrode wheel 13 is concentrated between the fin and tube at the point opposite the electrode. The tube wall has a tendency to give under this concentrated pressure, bringing into contact at 14 more area between the tube 11 and fin 10 than is in contact at 15 between the electrode 13 and the fin 10. Under these conditions it is impossible to pass enough current between the fin and tube to make a weld since there is a greater tendency for the fin to weld to the electrode wheel than to the tube because of the higher electrical resistance and consequently greater amount of heat developed due to the smaller contact area. I have discovered that as the weld progresses this condition diminishes because the fin becomes curved slightly tangential to the tube as a result of being pressed into the tube and as shown in Fig. 1b there is a wave 16 of tube metal that is being rolled back of the contact point by the electrode. As the original condition shown at 14 in Fig. 1 diminishes and less and less area is in contact between the fin and tube as indicated at 14a in Fig. 1b, the resistance at this point rises until the tube and fin begin to get hot enough to make a partial weld. As the partial welds are made, they fasten the fin to the tube at a point beyond that at which the electrodes are opposite at any instant and therefore cause the fin and tube to diverge back of the welding point due to the fin being fastened in the depression in the tube made by the electrode during previous welds. As soon as the fin is securely fastened, as appears in Fig. 1c, the amount of divergence between the fin and tube becomes more or less constant due to the fact that the fin is supporting part of the load imposed by the electrode wheel by cantilever action on previous welds and the pressure between the fin and tube is not as high as at the start of the welds. Under these conditions good welds can be made for the remainder of the length of the tube.

My experience indicates that tubes with thicker walls have less of the condition described above than do tubes with thin walls and the condition does not seem to exist if the fins or strips are being welded to a solid bar. There is also some indication that if the fins are stiffer the condition is reduced. A quantitative measure of the difference due to varied thickness of tube may be obtained from the fact that when welding a U-shaped fin made from .060" thick steel and having a base ⅜" wide at the bottom with 1⅜" long legs to 1⅛" O. D. #13 B. W. G. tube, the unwelded portion of the fin is 8" to 10" in length whereas in welding these same fins to a tube of like diameter but of #9 B. W. G. the unwelded portion is but 4" to 5" long.

To correct the condition described above I maintain a foot or so of the length of the fin beyond its leading end out of contact with the tube until the end portion of the fin has become fastened. This may be done by bending the fin to a wide radius as indicated in Figure 9, so that when brought into contact with the tube its extreme end portion contacts the latter while rearwardly of the welding point the fin diverges away from the tube by a distance equal to approximately ¼". As an alternative to imposing a curvature of the fin, I insert a spacer or shim between the fin and tube as shown in Fig. 2a at a point a foot or so back of the weld and start the weld at a distance approximately ¼" from the end of the fin. This has the effect of supporting the electrode on the fin as a simple beam supported at the end of the fin and at the shim. This makes possible high pressure between fin and electrode and a comparatively low pressure between the fin and tube at the point where the weld is being started. By this method it is possible to make a good weld from the starting point. As the weld proceeds to a point where welds would ordinarily be made without the shim, the effect of the shim in making the fin and tube diverge becomes superflous. Therefore, the shim when used with an automatic welding machine consists of part of a disc which is thinned gradually from the part thereof inserted at the beginning of the weld to the point that would remain between the fin and tube when the welding had processed to a point where good welding occurs without it and at this point the shim may be fully removed.

In Figure 3 the welding fixture 20 is shown as provided with oppositely positioned guide rolls 21, 22 between which the tube 11 is advanced automatically to and beyond the welding station at which a pair of electrode wheels 13 are located. As appears in Figure 4 the electrode wheels 13 located diametrically with respect to the tube are mounted on slides 23 in guide ways 24 on the fixture 20 so that they may be pressed toward the tube by suitable hydraulic mechanism (not shown) for exerting pressure on the bases of the fins. The diametrically located fins 10 are passed through the welding machine between sets of guide rolls 25 so that the electrode wheels 13 fit between the two legs 17 of each fin and bear against the base portion 18 to press it against the wall of the tube 11 which advances with it through the machine. Except for the guide rolls 21, 22 for the tube and 25 for the fin, none of the parts of the mechanism for supporting or advancing the fin and tube together to the welding point and discharging it from the machine are shown or described in detail herein. It is also believed apparent without detailed description or illustration that the welding wheels 13 are insulated from the remainder of the apparatus and from one side of the welding circuit while the other side is comprised of metallic parts of the machine with which the fins and tube are in contact, suitable provision being made for supplying an electrical current to these parts and for providing insulation where requisite.

The shims which are utilized to maintain the fins out of contact with the tube for a distance of a foot or so beyond the point where the welding wheel contact are designated 30. These consist of half discs of fiber secured to a hub 31 and rotatable on a shaft 32. As most clearly shown in Fig. 8, the shim 30 is thickest at 32, being about ¼ inch adjacent its leading edge 33 and gradually reduces in thickness to a paper edge at the portion 34 of the fin near its trailing edge 35 that comes to lie between the fins and tube when the welding has continued long enough to effect good bonds between the fin and the tube.

At the start of the welding operation the tube 11 and a fin 10 at each side thereof are fed into the machine so that the extreme end portion of the fins is engaged by the welding wheels 13 and pressed against the tube. At this time the thick portions 32 of the shims 30 are inserted between the bases 18 of the fins and the wall of the tube so that from the location of the shims to the welding point the fins are held away from the wall of the tube and diverge outwardly from the point where the ends of the fins are contacted by the welding electrodes. When welding begins the thickness of the shims by holding the parts of the fins immediately rearwardly of the welding point away from the tube reduce the area of contact between the fins and tube so that the resistance is high enough to permit a good weld to be made. As the welding continues and more and more of the fin becomes welded to the tube wall, even though at spaced points, the shims 30 are rotated about their supporting shaft 32 due to friction so that eventually the thinnest portion 34 of the shims is turned to lie between the fin and tube; when the tube and fins advance to a point clear of the shims 30 the latter may be returned to their original operating position as by a spring 30a fixed to the shim and anchored to the fixture 20.

What I claim is:

1. In a welding machine having a welding station, means for simultaneously feeding a metallic base member and a metallic strip of relatively thin cross-section past the welding station with said strip in contact with said base, and a welding electrode at said station contacting said strip and arranged to press it against said base; wedge means located at a point in advance of said welding station of electrically non-conductive material decreasing in thickness from end to end; means for moving said wedge to initially interpose its thickest portion between said strip and base and to present portions of progressively decreasing thickness between said parts as they advance past the welding station.

2. In a welding machine having a welding station, means for simultaneously feeding a metallic base member and a metallic strip of relatively thin cross-section past the welding station with said strip in contact with said base, and a welding electrode at said station contacting said strip and arranged to press it against said base; wedge means located at a point in advance of said welding station comprising a rotatively mounted, electrically non-conductive, sector-shaped member decreasing in thickness from one radial edge to the other; means for rotating said wedge to initially interpose its thickest portion between said strip and base and to present portions of progressively decreasing thickness between said parts as they advance past said welding station.

3. In a welding machine having a welding station, means for simultaneously feeding a metallic base member and a metallic strip of relatively thin cross-section past the welding station with said strip in contact with said base, and a welding electrode at said station contacting said strip and arranged to press it against said base; wedge means located at a point in advance of said welding station comprising a rotatively mounted, electrically non-conductive, sector-shaped member decreasing in thickness from one radial edge to the other and mounted to initially interpose its thickest portion between said strip and base, said member being frictionally engaged between said base and strip and rotated by the feeding movement thereof to present portions of progressively decreasing thickness between said parts as they advance past said welding station.

HOWARD P. GUIRL.